UNITED STATES PATENT OFFICE.

LE ROY H. MINTON, OF METUCHEN, NEW JERSEY, ASSIGNOR OF ONE-HALF TO ABRAM W. HERBST, OF PHILADELPHIA, PENNSYLVANIA.

ARGILLACEOUS COMPOSITION AND PROCESS OF MAKING THE SAME.

1,228,465.  Specification of Letters Patent.  Patented June 5, 1917.

No Drawing.  Application filed November 29, 1916.  Serial No. 134,068.

*To all whom it may concern:*

Be it known that I, LE ROY H. MINTON, a citizen of the United States, residing at Metuchen, in the county of Middlesex and State of New Jersey, have invented certain new and useful Improvements in Argillaceous Compositions and Processes of Making the Same, of which the following is a specification.

This invention relates to argillaceous compositions, to fire-hardened compositions made therefrom, and to processes of producing such compositions; and it pertains more particularly to architectural terra cottas having as their essential constituents clay and slag.

In the manufacture of fire-hardened argillaceous compositions such as terra cottas, it is customary to mix with the clay various proportions of already burnt clay, known as grog, mainly for the purpose of decreasing the amount of shrinkage which normally occurs when the clay body is fired. The terra cotta bodies made in this way are of such nature that they tend to disintegrate more or less readily from the attacks of the climate.

I have found that if slag, suitably comminuted or subdivided, be used in place of grog (burnt clay) the resulting terra cottas endure much longer the effects of the climate and also have a much greater crushing strength than the ordinary terra cottas. These properties appear to be due to the greater impermeability of the slag and to the fact that it is a much stronger binding medium than is burnt clay.

The blast furnace slag that I have found most suitable for the purposes of this invention is a so-called "acid" slag having a high silica, and a low lime, content and substantially free from iron. Such a slag may have, for instance, a composition of approximately 35% silica, 25% alumina, 35% calcium oxid, and 5% magnesium oxid, whereas a typical basic slag, which is less suitable in the present connection, would contain about 16% silica, 3% alumina, 17% iron oxid, 50% calcium oxid (partly free) and 7% magnesium oxid.

Although an acid slag ground up in the ordinary way may be used, I have found that a slag granulated by the wet process offers many advantages. Such granulated slag is readily freed from iron by passing it over a magnetic belt, and the resulting purified granulated slag requires practically no treatment preliminary to mixing it with the clay.

Various kinds of clays may be used in admixture with the slag, depending to some extent upon the purposes for which the finished product is to be used. Thus low grade fire clays, retort clays, and stoneware clays are suitable; the clay body usually comprises a mixture of two or more of these clays.

The process of making a typical terra cotta according to my invention may be illustrated by the following examples:—

A mixture containing 30% of a stoneware clay (for instance Edgar Bros. clay #9), 30% of a clay of the retort type or a low grade fire-clay (such as Enterprise clay #30), and 40% of blast furnace slag, preferably granulated and free from iron, and having a high silica, and low free lime, content, is ground together in a dry pan and put through a sieve of 16 mesh. This mixture is then intimately mixed with water in a pug mill or wet pan until it is of the proper consistency for pressing. The plastic body is then made into the desired form by pressing in a plaster mold, and, after drying, is slipped or glazed as desired and fired in a kiln to about Seger (Orton) cones 5—6.

If for the clay-slag mixture there is used 60% of low grade fire-clay (Enterprise clay #30) and 40% of the slag, the resulting plastic is fired to about cones 6—7 in order to attain the desired shrinkage and density.

A mixture containing 33% of stoneware clay, 33% of low grade fire-clay, and 33% of slag and prepared as in the first example, if fired at cones 4—5 will give a body sufficiently dense for terra cotta requirements.

One of the advantages in using slag is that the clay-slag mixture may be suitably hardened at a considerably lower temperature than a corresponding product made with a grog of burnt clay. In making terra cotta in the ordinary way it is usually necessary to carry the temperature to around cone 6 and often to cones 6—8. Although the temperature for firing the clay-slag mixtures herein described may be carried to cones 6—8 without objectionable fluxing of the acid slag, a hard strong body may be obtained at cones 4—5 and even lower, with suitable mixtures. Thus a body having excellent qualities may be obtained by heating to cones 2—3 a properly prepared mixture of 65% stoneware clay (Edgar #9 clay) and 35% granulated slag.

Where terra cottas are to be made, as in the above examples, the firing is done at a temperature high enough to destroy the peculiar plastic or colloidal properties of the clay but insufficient to cause undesirable vitrification. In the case of wares other than terra cotta, such as sanitary ware, stoneware, etc., higher temperatures may be used.

The terra cottas made with slag according to my process are characterized not only by their great weather-resisting qualities, but also by being considerably stronger, tougher, and lighter in weight than corresponding bodies made with grog. The use of granulated slag is especially desirable for architectural terra cottas because of its low specific gravity; and its ability to produce a harder and more impervious body at a given firing temperature than can be obtained with a corresponding clay-grog mixture at the same temperature increases appreciably the value of the fire-hardened product.

Although I have referred in the above examples to firing to temperatures ranging from cones 2 to 7 (corresponding to 1170 to 1270° C.), such temperatures being suitable for the production of terra cottas, my invention is not limited to these temperatures, or to the particular proportions or kinds of clays specified, since all these factors may be varied considerably, depending upon the character of the product desired, without departing from the spirit and scope of my invention.

I claim:

1. The process of making an argillaceous composition which comprises mixing clay with suitably subdivided acid furnace slag, substantially free from metallic iron, and sufficient water to produce a plastic mass, shaping and drying the mass and heating it to a temperature sufficient to destroy the peculiar plastic property of the clay.

2. The process of making an argillaceous composition which comprises mixing clay with suitably subdivided furnace slag and sufficient water to produce a plastic mass, shaping and drying the mass and heating it to a temperature sufficient to destroy the peculiar plastic property of the clay but insufficient to cause substantial vitrification of said mass.

3. The process of making an argillaceous composition which comprises mixing from about 60 to 70 parts of clay with from about 40 to 30 parts of subdivided slag and sufficient water to produce a plastic mass, drying and shaping the mass and heating it at a temperature sufficient to destroy the peculiar plastic property of the clay.

4. The process of making an argillaceous composition which comprises mixing from about 60 to 70 parts of clay with from about 40 to 30 parts of subdivided acid slag and sufficient water to produce a plastic mass, drying and shaping the mass and heating it at a temperature sufficient to destroy the peculiar plastic property of the clay but insufficient to cause substantial vitrification of said mass.

5. The process of making an argillaceous composition which comprises mixing clay with subdivided slag and sufficient water to produce a plastic mass, shaping and drying the mass and heating it to a temperature between cones 2 and 7.

6. The process of making an argillaceous composition which comprises mixing clay with subdivided slag and sufficient water to produce a plastic mass, shaping and drying the mass and heating it to a temperature of about cones 5—6.

7. The process of making an argillaceous composition which comprises mixing from about 60 to 70 parts of clay with from about 40 to 30 parts of subdivided slag and sufficient water to produce a plastic mass, drying and shaping the mass and heating it at a temperature of about cones 5—6.

8. The process of making architectural terra cotta which comprises adding water to a mixture of stoneware clay, low grade fire-clay, and granulated acid slag, which has been ground so as to pass through a sieve of about 16 mesh, to produce a plastic mass, drying the mass in any desired shape and firing to about cones 5—6.

9. The process of making architectural terra cotta which comprises mixing together about 30 parts of a stoneware clay, about 30 parts of a low grade fire-clay, and about 40 parts of granulated blast furnace slag high in silica, low in free lime, and substantially free from iron, adding sufficient water to the mixture to produce a plastic mass, drying and glazing the mass in any desired shape, and firing the dried mass to about cones 5—6.

10. An argillaceous composition comprising clay and furnace slag in such proportions as to be transformable into an architectural terra cotta when fire-hardened.

11. An argillaceous composition comprising about 60 to 70 parts of clay and about 40 to 30 parts of slag and transformable by heat into a hard, refractory mass.

12. An argillaceous composition comprising about 60 to 70 parts of clay and about 40 to 30 parts of granulated acid slag and transformable by heat into a hard, refractory mass.

13. An argillaceous composition comprising a mixture of stoneware clay, fire-clay or retort clay, and acid slag, said mixture being transformable by heat into a hard, refractory mass.

14. An argillaceous composition comprising a mixture of about 30 parts of stoneware clay, about 30 parts of a low grade fire-clay, and about 40 parts of granulated acid slag, said mixture being transformable by heat into a strong, hard terra cotta.

15. An argillaceous composition comprising a mixture of clay and furnace slag substantially free from metallic iron which is fire-hardened and substantially unvitrified.

16. An argillaceous composition composed of a fired mixture of about 60 to 70 parts of clay and about 40 to 30 parts of acid slag, and being hard and strong.

17. An argillaceous composition composed of a fired mixture of clay and slag, and characterized by having a physical structure and appearance the same as that of a terra cotta, and by its greater resistance to weather than that of a corresponding clay-grog terra cotta.

18. A terra cotta composed of a fired mixture of about 60 to 70 parts of clay and about 40 to 30 parts of slag.

19. A terra cotta composed of a fired mixture of about 60 to 70 parts of clay and about 40 to 30 parts of acid slag substantially free from iron.

20. A terra cotta composed of a fired mixture of about 30 parts of stoneware clay, about 30 parts of low grade fire-clay, and about 40 parts of slag high in silica, low in lime, and substantially free from iron, said terra cotta being substantially unvitrified and strongly weather resistant.

In testimony whereof I affix my signature.

LE ROY H. MINTON.

Copies of this patent may be obtained for five cents each, by addressing the "Commissioner of Patents, Washington, D. C."